(12) United States Patent
Hu et al.

(10) Patent No.: US 12,429,630 B2
(45) Date of Patent: Sep. 30, 2025

(54) MULTIFUNCTIONAL METASURFACE FLAT OPTICS

(71) Applicant: Massachusetts Institute of Technology, Cambridge, MA (US)

(72) Inventors: Juejun Hu, Newton, MA (US); Tian Gu, Acton, MA (US); Fan Yang, Cambridge, MA (US); Sensong An, Malden, MA (US); Hung-I Lin, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/714,483

(22) PCT Filed: Sep. 29, 2022

(86) PCT No.: PCT/US2022/077223
§ 371 (c)(1),
(2) Date: May 29, 2024

(87) PCT Pub. No.: WO2023/097130
PCT Pub. Date: Jun. 1, 2023

(65) Prior Publication Data
US 2024/0418907 A1   Dec. 19, 2024

Related U.S. Application Data

(60) Provisional application No. 63/283,803, filed on Nov. 29, 2021.

(51) Int. Cl.
G02B 1/00        (2006.01)
G02F 1/01        (2006.01)
(Continued)

(52) U.S. Cl.
CPC ........... G02B 1/002 (2013.01); G02F 1/0136 (2013.01); H04N 13/239 (2018.05);
(Continued)

(58) Field of Classification Search
CPC .... G02B 1/002; H04N 13/239; H04N 13/254; H04N 23/958; G02F 1/0136; G02F 2203/055; G02F 2203/07
(Continued)

(56) References Cited

U.S. PATENT DOCUMENTS

2015/0219806 A1   8/2015   Arbabi et al.
2016/0306079 A1   10/2016  Arbabi et al.
(Continued)

FOREIGN PATENT DOCUMENTS

CN   111007587 A    4/2020
CN   113608282 A    11/2021
(Continued)

OTHER PUBLICATIONS

Colburn et al., "Metasurface generation of paired accelerating and rotating optical beams for passive ranging and scene reconstruction." ACS Photonics 7.6 (2020): 1529-1536.
(Continued)

Primary Examiner — Bumsuk Won
Assistant Examiner — Mitchell T Oestreich
(74) Attorney, Agent, or Firm — Smith Baluch LLP

(57) ABSTRACT

Meta-optic systems are described that include multi-function metasurfaces formed from a plurality of meta-atoms. A multi-function metasurface can exhibit two or more different optical functions for two or more different states of light incident on the metasurface. Different states of light include different polarizations, different wavelengths, and different angles of incidence. Different optical functions include distance sensing, converging, diverging, image formation,
(Continued)

and patterned light formation. The multi-function metasurface can selectively impart different phase profiles to an incident beam depending on the incident beam's state of light.

13 Claims, 9 Drawing Sheets

(51) Int. Cl.
  *H04N 13/239* (2018.01)
  *H04N 13/254* (2018.01)
  *H04N 23/958* (2023.01)

(52) U.S. Cl.
  CPC .... *G02F 2203/055* (2013.01); *G02F 2203/07* (2013.01); *H04N 13/254* (2018.05); *H04N 23/958* (2023.01)

(58) Field of Classification Search
  USPC ......................................................... 359/246
  See application file for complete search history.

(56) References Cited

U.S. PATENT DOCUMENTS

| | | | |
|---|---|---|---|
| 2019/0154877 A1 | 5/2019 | Capasso et al. | |
| 2019/0178714 A1* | 6/2019 | Faraji-Dana | G02B 5/1847 |
| 2020/0348500 A1 | 11/2020 | Kwon et al. | |
| 2021/0044748 A1 | 2/2021 | Hu et al. | |
| 2021/0286188 A1 | 9/2021 | Rubin et al. | |
| 2021/0306564 A1 | 9/2021 | Hu et al. | |
| 2021/0307608 A1 | 10/2021 | Hu et al. | |

FOREIGN PATENT DOCUMENTS

| | | |
|---|---|---|
| WO | 2016164961 A1 | 10/2016 |
| WO | 2019136166 A1 | 7/2019 |

OTHER PUBLICATIONS

Greengard et al., "Depth from diffracted rotation." Optics letters 31.2 (2006): 181-183.
Pavani et al., "High-efficiency rotating point spread functions." Optics express 16.5 (2008): 3484-3489.
Pavani et al., "Three-dimensional, single-molecule fluorescence imaging beyond the diffraction limit by using a double-helix point spread function." Proceedings of the National Academy of Sciences 106.9 (2009): 2995-2999, 5 pages.
Quirin et al., "Depth estimation and image recovery using broadband, incoherent illumination with engineered point spread functions." Applied optics 52.1 (2013): A367-A376, 10 pages.
Schechner et al., "Depth from defocus vs. stereo: How different really are they?." International Journal of Computer Vision 39.2 (2000): 141-162.
Schechner et al., "Wave propagation with rotating intensity distributions." Physical Review E 54.1 (1996): R50, 4 pages.
Shechtman et al., "Optimal point spread function design for 3D imaging." Physical review letters 113.13 (2014): 133902, 11 pages.
Sitzmann et al., "End-to-End Optimization of Optics and Image Processing for Achromatic Extended Depth of Field and Super-Resolution Imaging." ACM Trans. Graph. 2018, 37 (4), 1-13, 14 pages.
Thompson et al., "Localizing and tracking single nanoscale emitters in three dimensions with high spatiotemporal resolution using a double-helix point spread function." Nano letters 10.1 (2010): 211-218, 14 pages.
Thompson et al., "Three-dimensional tracking of single mRNA particles in *Saccharomyces cerevisiae* using a double-helix point spread function." Proceedings of the National Academy of Sciences 107.42 (2010): 17864-17871, 8 pages.
Yang et al., "Wide field-of-view flat lens: an analytical formalism," arXiv:2108.09295v2 [physics.optics] Aug. 24, 2021, 14 pages.
Zhou et al., "Flat optics for image differentiation." Nature Photonics 14.5 (2020): 316-323, 25 pages.
International Search Report and Written Opinion in International Application No. PCT/US2022/077223 mailed Mar. 3, 2023, 14 pages.
First Office Action with Search Report and Translation in Chinese Appl. No. 2022800784967 dated Mar. 29, 2025, 14 pages.
Aiello, Maxwell et al. "Achromatic varifocal metalens for the visible spectrum." Cornell University, XP081131619, arXiv preprint arXiv:1903.03930 (2019), 21 pages.
Colburn, Shane et al. "Metasurfaces for generating complementary wavefront-coded beams for three-dimensional scene reconstruction." 2020 Conference on Lasers and Electro-Optics (CLEO). IEEE, 2020, 2 pages.
Colburn, Shane et al. "Single-shot three-dimensional imaging with a metasurface depth camera." arXiv preprint arXiv:1910.12111 (2019). Cornell University, 21 pages.
Colburn, Shane, "Design of computational imaging systems using wave front-coded dielectric metasurfaces" Dec. 31, 2020, XP093122249, Thesis, 157 pages.
Extended European Search Report in European App. No. 22899468.7 dated Aug. 5, 2025, 12 pages.
Zang, et al. "Terahertz metalens for manipulating focal point and imaging." 2020 45th International Conference on Infrared, Millimeter, and Terahertz Waves (IRMMW-THz). IEEE, 2020, 2 pages.
Zou, et al. "Imaging based on metalenses." PhotoniX 1.1 (2020): 2., Mar. 2020, XP-03259478, 24 pages.

\* cited by examiner

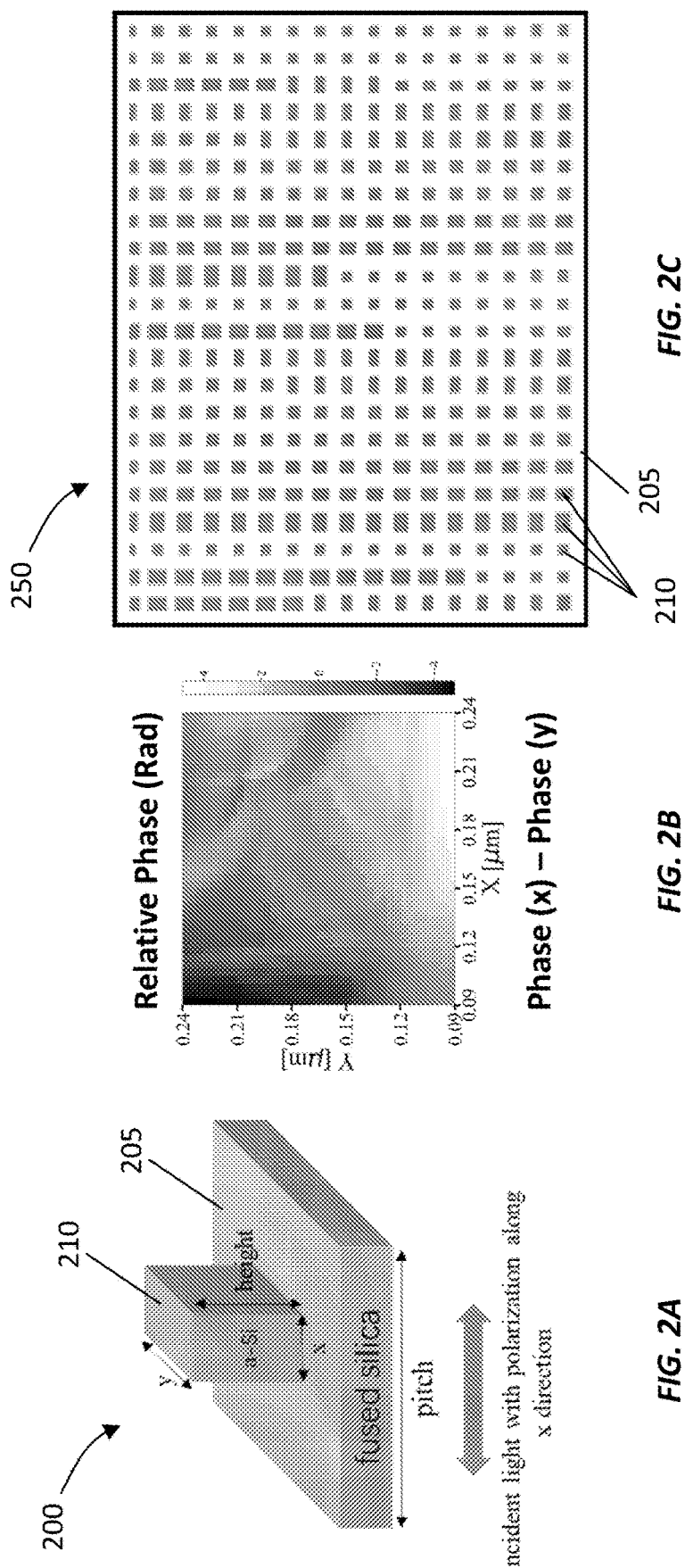

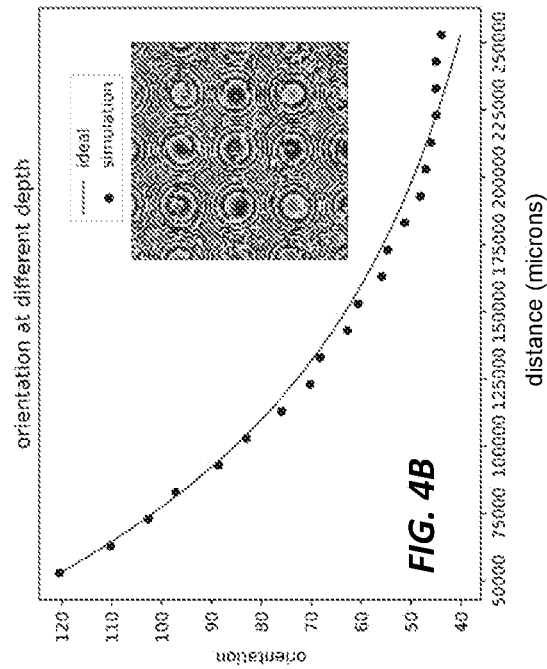
FIG. 4B
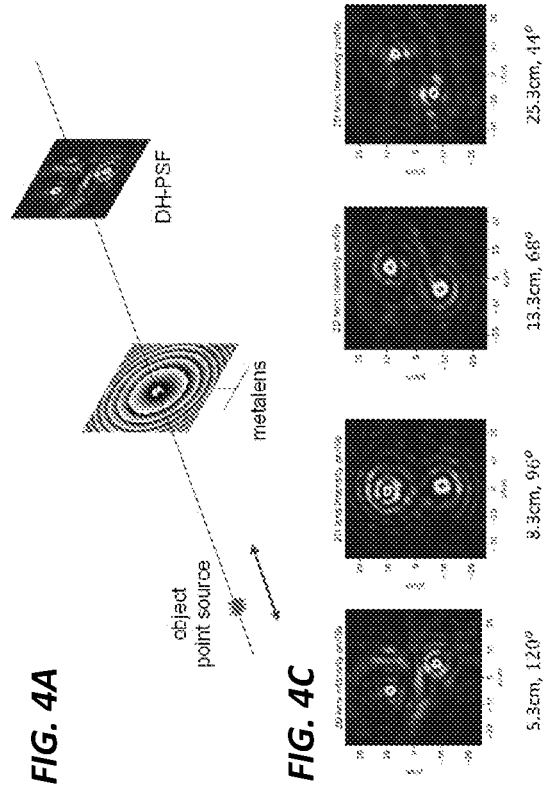
FIG. 4A
FIG. 4C

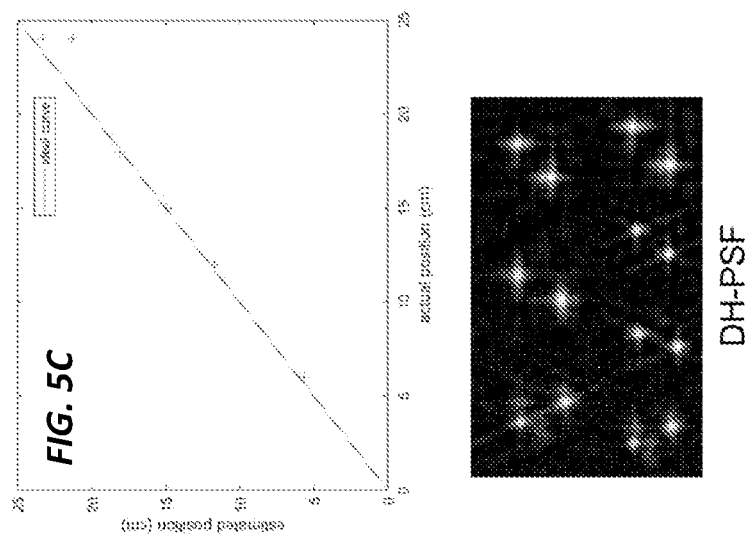
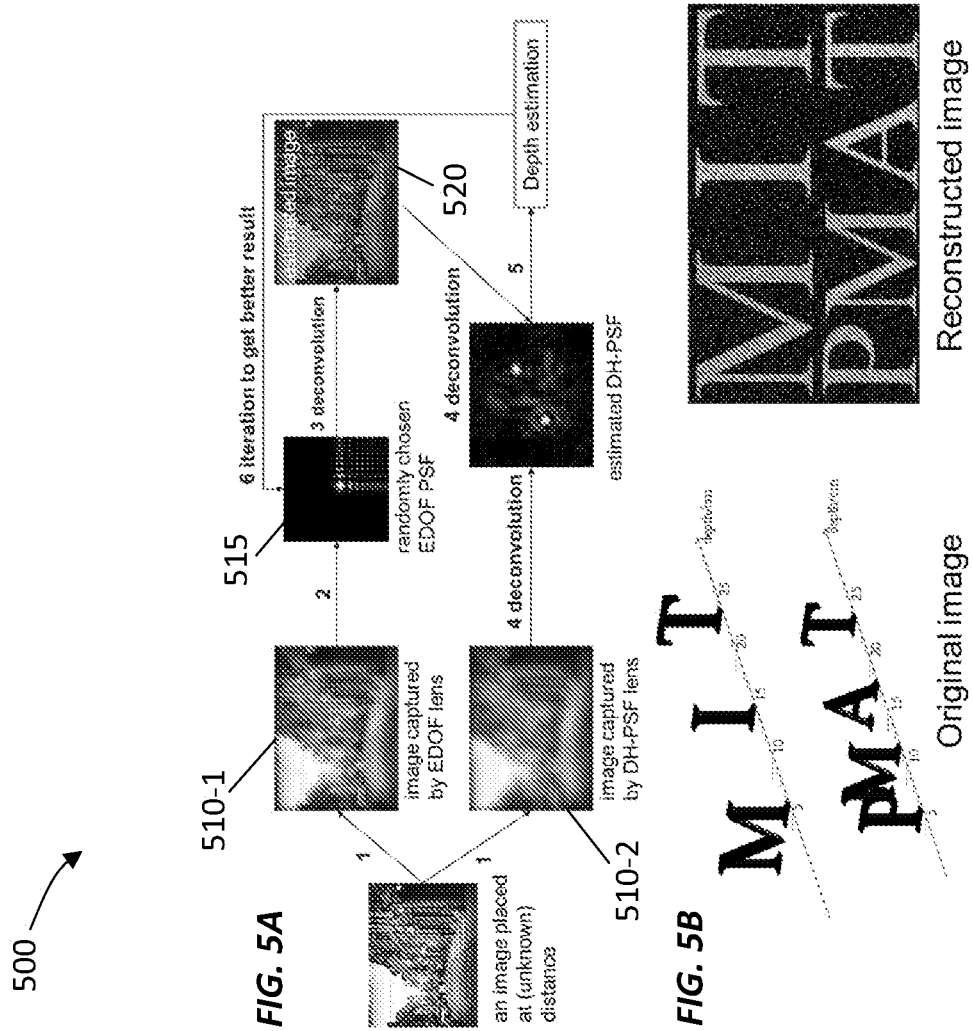

MULTIFUNCTIONAL METASURFACE FLAT OPTICS

CROSS-REFERENCE TO RELATED APPLICATION

The present application claims a priority benefit, under 35 U.S.C. § 119 (e), to U.S. provisional application Ser. No. 63/283,803 filed on Nov. 29, 2021, titled "Multifunctional Metasurface Flat Optics," which application is incorporated herein by reference in its entirety.

GOVERNMENT SUPPORT

This invention was made with government support under HR0011-17-2-0029 awarded by the Defense Advanced Research Projects Agency. The government has certain rights in the invention.

BACKGROUND

Meta-optics continue to be developed as alternative optical components and systems to more traditional lens, phase mask, and filter optical systems. A meta-optic includes a patterned array of microscale structures on at least one surface of a substrate through which light passes. The shape of the structures and their layout on the surface can be designed to provide a desired far field pattern or wavefront of an optical field incident on the meta-optic. Meta-optics can be designed to compensate for optical aberrations (e.g., to obtain high-resolution, ultra-wide field-of-view imaging). An advantage of a meta-optic over a conventional optical system is that a high-quality optic can be fabricated on a substrate having planar surfaces using conventional microfabrication technologies instead of grinding and polishing curved surfaces on one or more lenses to form a compound lens that has similar optical performance at best.

SUMMARY

The present technology is related to optics and optical systems, including sub-wavelength optics, metasurfaces, metamaterials, multifunctional flat optic devices, architectures, and systems offering improved performance, new functions, and greater structural simplicity compared to traditional bulk optical systems. Such optical devices and systems are useful for computational imaging, three-dimensional (3-D) sensing, imaging, and other applications. More generally, applications for multifunctional metasurface flat optics include but are not limited to imaging, sensing, and optical computing techniques, such as machine vision, image classification, compressed sensing, multispectral imaging, light field imaging, computing, polarimetry.

In some implementations, a meta-optic can exhibit two or more optical states or optical functionalities. The optical states of each meta-optic can capture different information of a scene (e.g., using different spectral or polarization channels) or perform different optical functions for subsequent data fusion or reconstruction (e.g., one state for imaging and one state for performing edge detection). Edge detection can be implemented using a 2-D Laplace operator phase profile for performing second-order spatial differentiation. In another example, one optical state can be used for capturing spatial information and one state used for capturing spectral/polarization information, etc.

An inventive meta-optic architecture may include a substrate and a multiplexed metasurface positioned on one side of the substrate. The multiplexed metasurface is configured to operate in at least two modes that affect the incident light differently according to the property of the light (e.g., its polarization, wavelength, incident angle, etc.). As an example, to realize polarization-dependent multifunctional meta-optics, the multiplexed metasurface is designed to provide different optical responses to light with different polarization states (e.g., a first optical response for x-polarized light and a second optical response for y-polarized light) or different wavelengths to, for example, obtain different information about an imaged scene. By providing different optical responses, the meta-optic can effectively act as a wavefront-encoding element with different functions. Toggling a polarizer, filter, or illumination light source to vary the polarization state, wavelength, or incident angle of the incident light can select the optical response desired from the multiplexed meta-optic. In some implementations, more than two optical responses are possible from a meta-optic. In addition to different optical responses for different polarization states, the meta-optic may also be designed to exhibit other optical responses for other states of the incident light (e.g., different wavelength states, different incident angle states, etc.) to provide multiplexed functionalities for multiple tasks.

The present technology can be implemented as an optic comprising a substrate and a metasurface disposed on a first side of the substrate. The metasurface can be configured to impart a depth-sensitive phase profile to incident light in a first state and to impart a depth-insensitive phase profile to incident light in a second state different than the first state.

Other embodiments of the present technology include parfocal zoom lenses. An inventive parfocal zoom lens may include a first transparent substrate, a second transparent substrate spaced apart from the first transparent substrate, a first metasurface disposed on a surface of the first transparent substrate, and a second metasurface disposed on a surface of the second transparent substrate. Alternatively, the first and second metasurfaces can be disposed on first and second surfaces of the same transparent substrate. In both cases, the first and second metasurfaces are configured to generate a first light intensity/field distribution from light in a first state and to generate a second light intensity/field distribution different than the first light intensity/field distribution from light in a second state different than the first state. For example, the first and second metasurfaces may focus horizontally and vertically polarized light to the same focal plane with different magnifications.

All combinations of the foregoing concepts and additional concepts discussed in greater detail below (provided such concepts are not mutually inconsistent) are contemplated as being part of the inventive subject matter disclosed herein. All combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A depicts a perspective view of a polarization-sensitive, amorphous silicon-on-silica meta-atom suitable for use in an inventive metasurface.

FIG. 2B plots the difference between simulated phase profiles of the meta-atom of FIG. 2A for x-polarized and y-polarized light.

FIG. 2C depicts a portion of the metasurface layout with an array of polarization-sensitive meta-atoms, each similar to the one in FIG. 2A but with different x and y dimensions.

Figure 3:
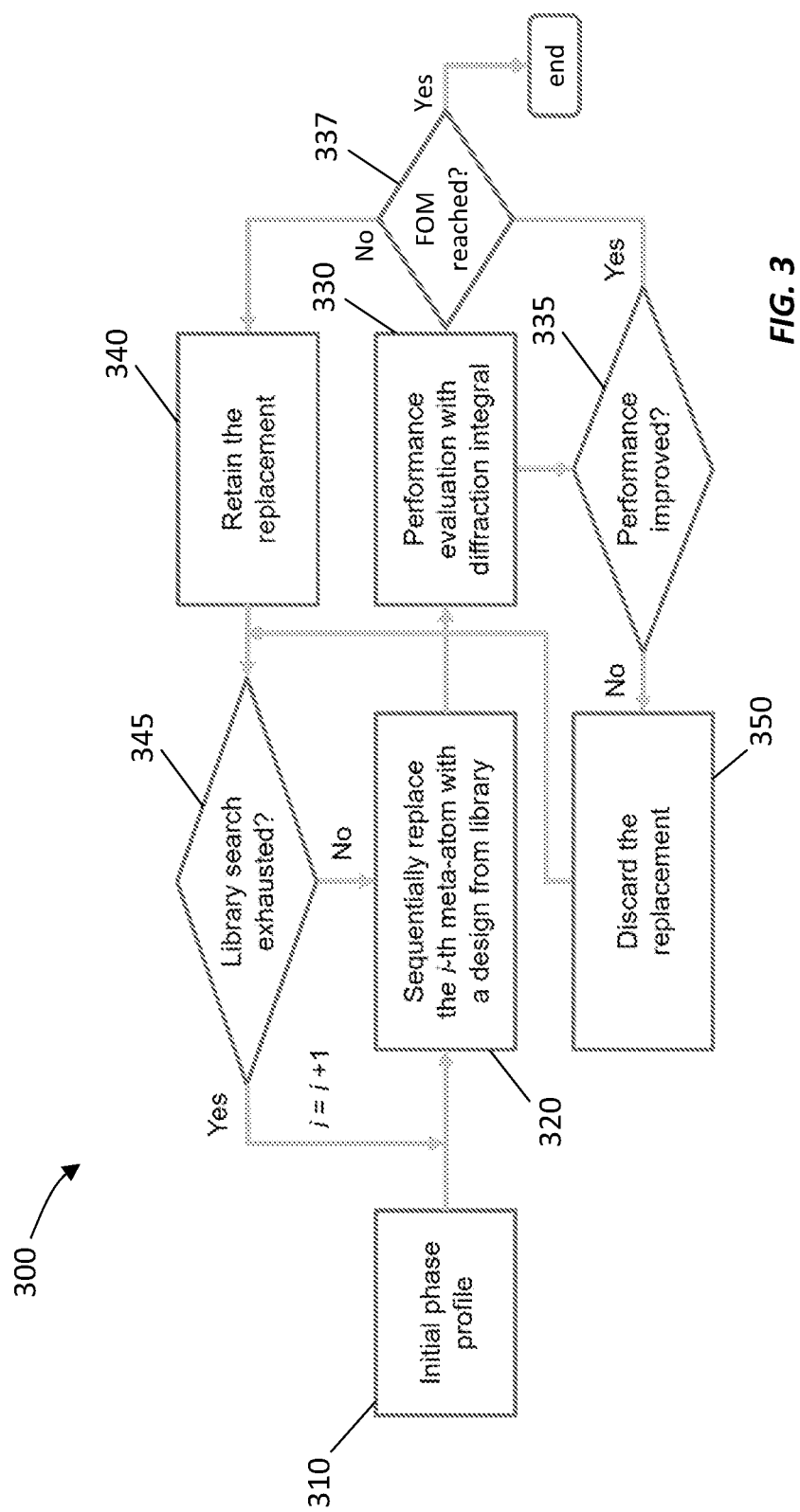

FIG. 3 is a flow chart of a modified direct search process for selecting and arraying meta-atom across a metasurface.

FIG. 4A illustrates a model for simulating performance of a depth-sensitive meta-optic that generates foci that rotate as a function of depth or distance from the meta-optic.

FIG. 4B is a plot of foci orientation versus depth for the meta-optic of FIG. 4A (phase profile shown in the inset image).

FIG. 4C plots simulated point spread functions (PSFs) of a point-source object positioned at different depth from the meta-optic of FIG. 4A.

FIG. 5A illustrates an image reconstruction and depth estimation process using an inventive meta-optic.

FIG. 5B illustrates a simulated 3-D object (left), a simulated reconstructed image of the 3-D object obtained with an inventive meta-optic and the process of FIG. 5A (center), and the double-helix point spread function (DH-PSF) of the inventive meta-optic (right).

FIG. 5C plots the estimated depth of an imaged 3-D object from the meta-optic based on the DH-PSF versus the actual depth of the 3-D object from the meta-optic.

Figure 6:
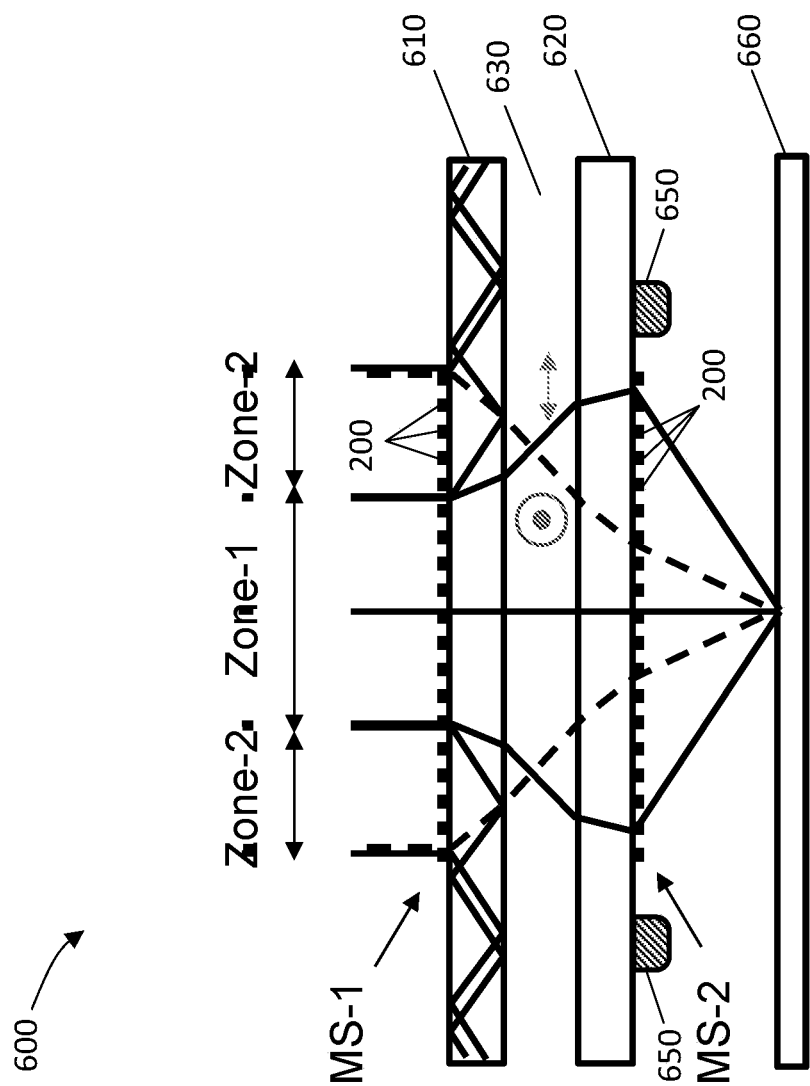

FIG. 6 is a schematic of a parfocal zoom lens with two multiplexed metasurfaces (MS-1 and MS-2), with solid and dashed rays indicating light with different properties (e.g., different polarization states).

Figure 7:
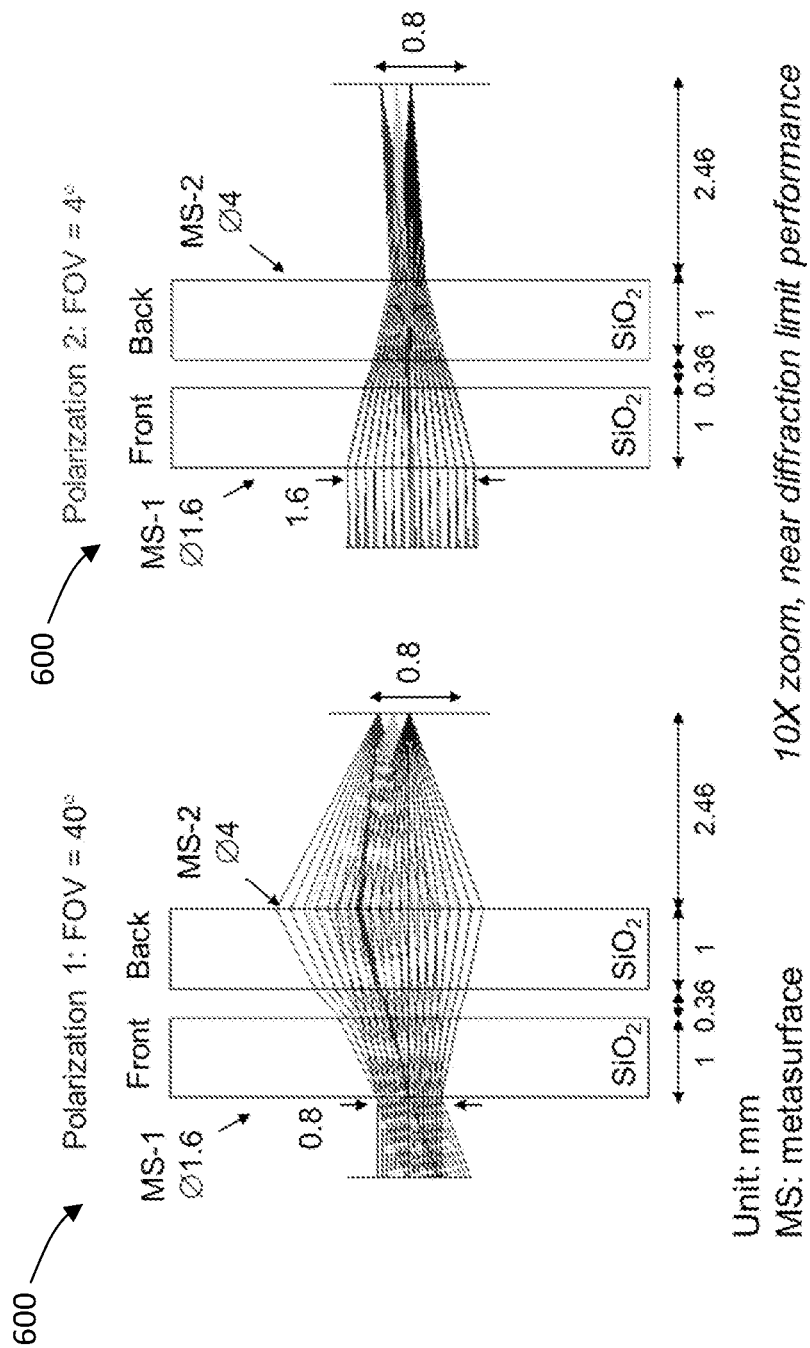

FIG. 7A illustrates design and optical simulation results of a 10× parfocal zoom lens incorporating two multiplexed metasurfaces that operates at a FOV of 40 degrees at a first state (e.g., polarization 1) with near diffraction-limited imaging performance.

FIG. 7B illustrates the 10× parfocal zoom lens of FIG. 7A operating at a FOV of 4 degrees at a second state (e.g., polarization 2) with near diffraction-limited imaging performance.

Figure 8:
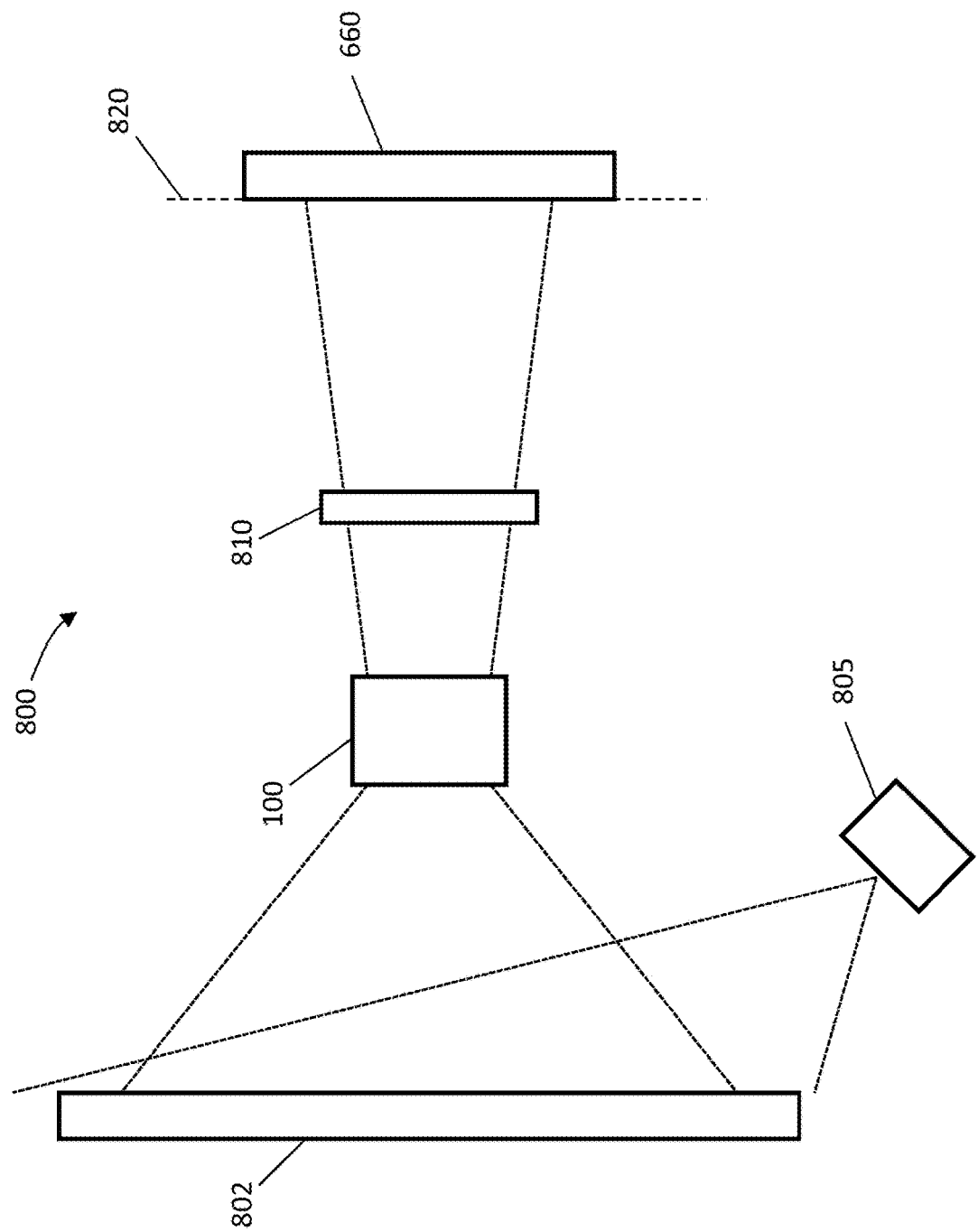

FIG. 8 depicts and example of an optical system that includes a multifunction meta-optic.

DETAILED DESCRIPTION

I. Computational Meta-Optics for 3-D Imaging

A 3-D imaging/sensing architecture based on computational metasurface flat optics offers dramatically enhanced performance and an ultra-compact flat form factor. This approach combines ultra-wide field-of-view (FOV) and computational imaging capabilities in as few as a single-piece optical system, though two or more optical pieces can be used in some cases. A compact, multifunction meta-optic device includes the following features: (1) multifunctional, multiplexed flat optics designs; (2) an ultra-wide FOV (e.g., from 100° to nearly) 180° with high resolution imaging; (3) extended depth-of-field (EDOF); and (4) as few as a single-piece, ultra-compact, lightweight optical architecture. The multiplexed meta-optics and wide-FOV features can be decoupled for some implementations to provide different FOVs, e.g., 1°, 10°, 20°, 30°, 40°, 50°, 60°, 70°, 80°, 90°, 100°, 110°, 120°, 130°, 140°, 150°, 160°, 170°, 180° or any sub-range from 1° to 180°. Advantageously, a meta-optic having one or more metasurfaces can realize both the wide-FOV and multiplexed optical functions simultaneously, without making any changes to the meta-optic when in use.

The optical structure and metasurface designs for such multifunctional meta-optics are compatible with foundry manufacturing and therefore allow low-cost fabrication and integration with commercial image sensors and light emitters within an ultra-compact sensor module. For example, a meta-optic sensor module can have a form factor between 0.1 cubic centimeter (cc) and 10 cc in some cases, or between 0.1 cc and 1 cc in some cases.

Existing 3-D sensors typically rely on active illumination and/or triangulation techniques to perceive depth as may be done, for example, in structured light (SL), time-of-flight (TOF), and passive/active stereoscopic imaging approaches. Alternatively, depth information can be extracted using depth from defocus (DFD) methods that analyze the axially dependent image aberrations caused when defocusing an imaging system. While simplifying the optical system configuration, such DFD approaches either suffer from degraded depth precision or require dynamic image acquisition as the depth-resolving capability of conventional lenses is fundamentally limited by their point spread functions (PSFs), which vary slowly with the depth of an object. The term "depth" is typically used in the field to refer to distance of an object from an imaging lens or imaging system.

Alternative approaches to determining depth have been developed by spatially engineering a PSF to enhance its depth discrimination capability. Among different methods, the double-helix PSF (DH-PSF) approach has been successfully shown to be effective in distinguishing depths by generating 3-D PSFs that produce two lobes rotating continuously as the depth of the object from the imaging lens or imaging system changes. The DH-PSF function has been realized by either incorporating a spatial light modulator (SLM) that switches its phase profile between a DH-PSF and a depth-insensitive phase or using a double-aperture metasurface configuration with a pair of laterally adjacent phase masks that produce side-by-side images for capture by an image sensor. While both approaches show improved performance in terms of depth precision and depth-of-field, the former suffers from a rather complicated optical setup (involving the SLM, 4f correlator, and imaging lens) and the latter relies on shared apertures that ultimately sacrifice efficiency and camera compactness and are difficult to incorporate other optical functions.

Figures 1A, 1B:
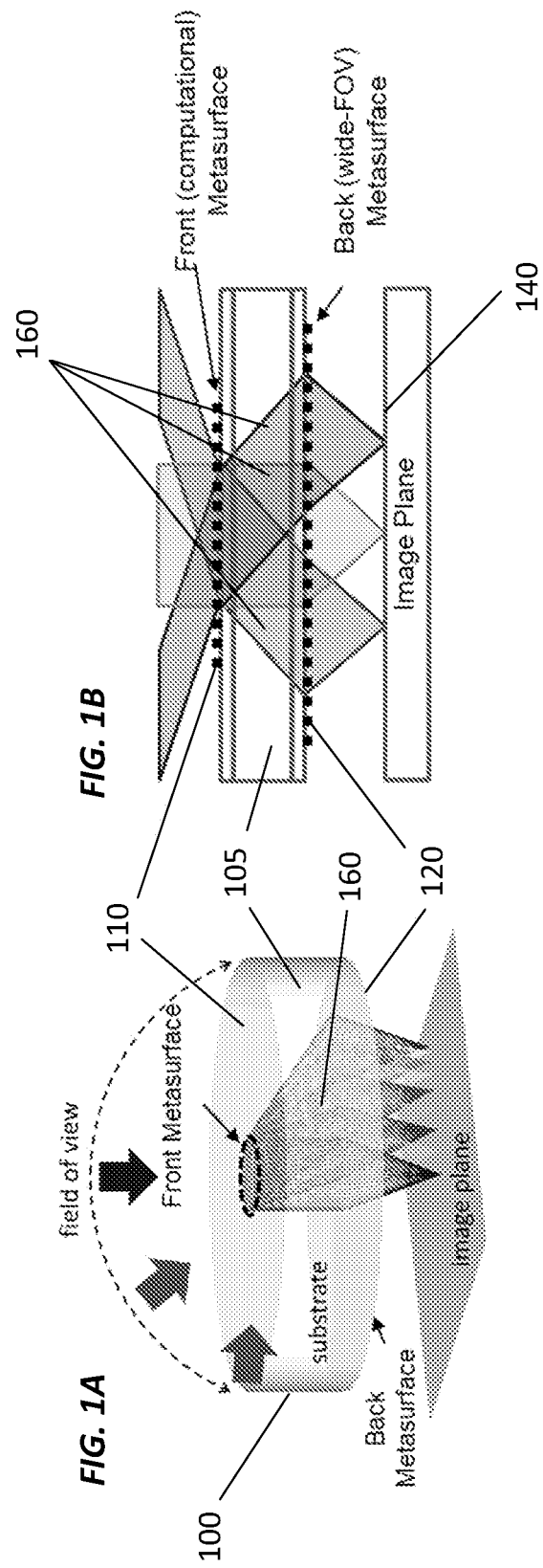
FIG. 1A depicts a perspective view of a 3-D imaging/sensing meta-optic architecture incorporating a front metasurface for computational imaging and a back metasurface for wide field-of-view (FOV) imaging.
FIG. 1B depicts an elevation view of the 3-D imaging/sensing meta-optic architecture of FIG. 1A.

FIG. 1A and FIG. 1B show a multifunctional, multiplexed metasurface flat optic, also called a meta-optic 100, with significantly enhanced optical performance and potentially very small optical system dimension. The meta-optic includes a single flat, transparent substrate 105 with a first multiplexed metasurface 110 (for computational imaging) positioned on the front side (first surface) and a second metasurface 120 (for wide-FOV imaging) positioned on the back side (second surface). The front multiplexed metasurface is configured to operate in at least two modes (e.g., provide at least two optical functions) that encode the phase-front of the incident beam differently depending on the property of the incident light (e.g., its polarization, wavelength, incident angle, etc.). In terms of incident angle, different optical functions can be elicited for different incident angle values (e.g., two different elevation angles) and/or for different incident angle directions (e.g., a same elevation angle at two different azimuthal angles). Additionally, different optical functions can be elicited for different orbital angular momenta. The encoding can be used to assist with image post processing and/or for modulating the light differently to realize different optical functions.

In some cases, light beams 160 having different angles of incidence (AOI) can be generated by the first metasurface 110 and subsequently transmitted to the backside second metasurface 120 and focused onto a planar (i.e., flat) image plane 140 where the image sensor is located, though in some implementations the image plane can be curved in one dimension (cylindrical, parabolic, etc.) or two dimensions (spherical, paraboloid, etc.). The foci may be spatially separated on the image plane 140, in some cases, so that their corresponding electronic images (which may be captured by a CCD camera or CMOS imaging array, for example) can be operated on independently of each other. The separation of the light beams may depend upon polarization, wavelength, or incident angle of the light incident on the first metasurface 110.

Some example multifunctional meta-optics will now be considered. A first example is a multifunctional meta-optic that can toggle between at least two optical functions based on polarization states or orbital angular momentum (OAM) states of the incident light. Polarization states can include conventional orthogonal states such as vertical and horizontal (or sagittal and tangential), right and left circularly polarized, as well as different elliptical polarization states. For a polarization-multiplexed metasurface, toggling between polarization states can effectively select a particular functionality (e.g., converging lens or diverging lens) for which the metasurface was designed. Toggling of polarization can be done by rotating a polarizer in the incident light beam path for unpolarized light sources, rotating a half-wave plate in the beam path of a polarized light source, rotating a polarized light source, etc. In some cases, a controllable liquid crystal device may be used to change the polarization state of the incident light or serve as a filter. In such implementations, changing the polarization state effectively changes the phase profile presented by the metasurface. In other cases, filters or pixelated filter arrays with different filtering properties can be integrated on the image sensor or sensor pixel arrays, so that images generated corresponding to different light properties (e.g., polarization states or wavelengths) can be captured by different sensors or sensor pixels. OAM selective metasurfaces may be constructed to capture images with different OAM modes. Such metasurfaces may be further superposed together to form a multiplexed OAM-metasurface to capture images of multiple OAM modes.

The switching of the polarization (and effectively of the meta-optics phase profile) can allow the front metasurface to capture different information of a scene, allowing high-quality 3-D scene reconstruction or information extraction via post processing. For 3-D sensing or passive ranging, for instance, the front multiplexed metasurface can be designed to have at least two different phase profiles under light with different polarizations: (1) a depth-sensitive phase profile that generates two foci that rotate as the object shifts in depth and (2) a depth-insensitive phase profile that produces depth-insensitive responses, as described further below. Assuming eight phase levels are used to cover the 2× phase range, the front multiplexed metasurface may include a total of $8^2=64$ different types of meta-atoms, with each meta-atom providing a distinct combination of two phase values under different polarized light. If more phase profiles (i.e., optical functions) and/or phase levels are included, in order to realize n arbitrary phase profiles with m discrete phase levels, a total of $m^n$ meta-atom designs may be used.

The back metasurface can be designed to be polarization insensitive (e.g., symmetric meta-atom geometries against different polarizations) to maintain a wide light collection angle under all circumstances or polarization sensitive to further multiplex the computing process. In addition to polarization, the metasurfaces can also be designed to impart different phase profiles based on other properties of the incident light (e.g., wavelength, incident angle, etc.). These phase profiles can provide additional multiplexed functionalities to accomplish multiple tasks, including other optical processing/computing tasks assigned to each metasurface.

Figure 1C:
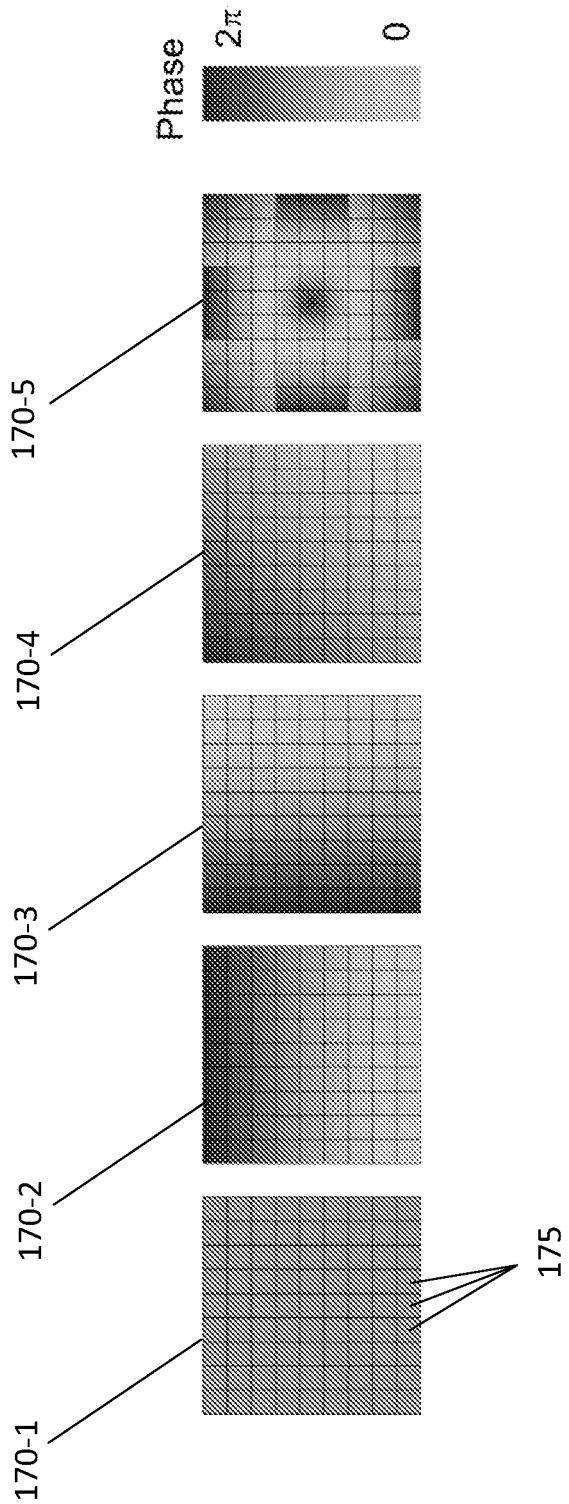
FIG. 1C depicts five 9×9 unit-cell arrays of meta-atoms arranged to form different super cells for a metasurface.

Depending on the properties of the incident light, meta-atoms may also be configured to provide different functions/responses when used as an individual meta-atom or groups of meta-atoms (i.e., super cells). FIG. 1C depicts examples of five different super cells 170-1, 170-2, . . . 170-5 that are each made up of 81 unit cells 175 of meta-atoms. Each unit cell 175 can include many meta-atoms. There can be any number of unit cells 175 that make up a super cell 170. Such super cells of meta-atoms may be in-plane (e.g., meta-atoms positioned on the same surface across a substrate), out-of-plane (e.g., meta-atoms positioned on different surfaces or layers over one another on a substrate), or a combination of both. Multiple layers of meta-atoms may also be stacked to provide different optical functions or responses.

A metasurface can include a plurality of super cells 170 arranged in an array. The super cells 170 can be configured to provide different collective optical responses depending on the properties of the incident light. For example, a metasurface may be characterized by at least two pitches and operate on at least two wavelengths. For example, the individual meta-atoms within the unit cells 175 and/or their spacing or pitch are configured to modulate the light of a first wavelength (e.g., a smaller wavelength), while groups of multiple meta-atoms (e.g. unit cells 175 or super cells 170) and/or their spacing or pitch are configured to modulate the light of a second wavelength (e.g., a larger wavelength).

Different super cells 170 may provide different optical functions. For example, the unit cells 175 of a super cell 170-2 may be rearranged to form different super cells 170-3, 170-4, 170-5 to provide different optical functions, as depicted in FIG. 1C. The unit cells 175 and super cells 170 can be designed to operate at first and second wavelengths, respectively. For the four super cells 170-2, 170-3, 170-4, 170-5 shown in FIG. 1C, while the unit cells 175 can provide different phase profiles (varying across the supercell) to an optical beam of a first wavelength that is incident on the super cell 170, an optical beam at a second wavelength can see a uniform phase profile (no variation in phase across the supercell). With a different arrangement of unit cells, a metasurface can be formed to provide multiplexed functions at two or more wavelengths. For example, a first optical beam at a first wavelength that is incident on the supercell can undergo a first optical transformation (e.g., a collimated beam at the first wavelength can be made divergent by the supercell), whereas a second optical beam at a second wavelength that is incident on the same supercell can undergo a second optical transformation that is different than the first optical transformation (e.g., a collimated beam at the second wavelength can be made convergent by the supercell).

FIGS. 2A, FIG. 2B, and FIG. 2C illustrate an exemplary meta-atom design and its performance at a wavelength of 670 nm. FIG. 2A depicts an example meta-atom 200 includes a rectangular block 210 of high refractive index material (e.g., amorphous silicon) on a lower index substrate 205 (e.g., fused silica). Varying the geometry of the blocks 210 in an array of meta-atoms 200 provides diverse polarization-dependent phase responses under x- and y-polarized light, as plotted in FIG. 2B. Each datapoint in FIG. 2B is for a single meta-atom design in an array of identical meta-atoms 200 where each meta-atom 200 has a length y and a width x indicated by the axes on the plot. The difference in phase imparted by the meta-atom 200 between x-polarized light and y-polarized light incident on the array is plotted as a relative phase value in radians that is indicated by gray shading. The entire plot includes meta-atoms with different lateral dimensions (lengths y and widths x). The meta-atoms have a fixed height of 450 nm and a fixed pitch of 300 nm. In this example, the meta-atom 200 is asymmetric about an optical axis extending vertically through a center of the rectangular block 210 which gives the meta-atom different responses for different polarizations. For a symmetric meta-atom (such as a cylinder), different wavelengths can be used to elicit different optical responses from the meta-atoms.

FIG. 2C shows a portion of a polarization-sensitive metasurface 250 constructed from meta-atoms 200 in a meta-atom library. The blocks 210 of the meta-atoms 200 can vary in shape across the metasurface 250. An array of meta-atoms can be arranged to form unit cells (e.g., of supercells) or building blocks that make up the entire polarization-sensitive metasurface of a meta-optic. The polarization-sensitive metasurface can be created using an inverse design method to extract information about a scene that will be imaged or otherwise sensed with the meta-optic.

According to one implementation, the entire polarization-sensitive metasurface is designed to impart (for one polarization) a depth-sensitive phase profile that can produce two foci from a single point source, where the two foci rotate as a function of depth/distance of the point source from the metasurface. When the distance between the point source and metasurface is changed, the two foci rotate in the image plane about the metasurface's optical axis, according to the depth of the object. While a metasurface can be designed to provide an optical transformation (for one polarization) that is like a double-helix PSF (DH-PSF) based on the phase-only superposition of Laguerre-Gauss modes, the metasurface's performance is usually limited by background noise, works over a limited range of distances between the metasurface and point source, and provides limited depth accuracy. To overcome these limitations, the inventors utilize a gradient-based numerical optimization method to enhance and precisely engineer a metasurface that can provide an improved DH-PSF intensity distribution in response to changes in distance between the object and metasurface. With the gradient-based numerical optimization method, the inventors can customize the inverse design targets to realize improved depth detection accuracy and/or improved range of metasurface-to-object distances, high resolution imaging, improved optical efficiency, and increased signal-to-noise ratio (SNR), as well as compliance with fabrication tolerances.

To improve optical performance and allow increased design complexity as compared to existing approaches, an end-to-end design framework is used to efficiently develop meta-optical systems that can provide multiple optical functions with a single optic. One of the optical functions can be a DH-PSF, for example. FIG. 3 shows a modified direct binary search (DBS) process 300 (a perturbation-based iterative method) for selecting and arraying meta-atoms to form at least one metasurface of a meta-optic. In this process, the meta-atoms are used as building blocks to construct at least one multiplexed, multifunctional metasurface to extract various information of a scene that will be imaged or otherwise sensed by the meta-optic. The DBS process 300 starts with an initial metasurface design (to impart an initial phase profile 310 to an incident beam) for a particular optical function. The process 300 then sequentially replaces each meta-atom across the metasurface with alternative designs from a library of different meta-atom designs and adopts the one yielding the best performance. Generally, the dimensions, geometry, symmetry, pitch of the meta-atoms and the distance between meta-atoms (i.e., meta-atom pitch) can be varied to produce the desired performance. In some cases, an application-specific weighted figure-of-merit (FOM) is first defined for performance evaluation (e.g., a PSF intensity distribution, wavefront aberration function, optical intensity distribution, efficiency, inter-state contrast, etc.). One or more meta-optic parameters (e.g., meta-atom design, meta-atom spacing, meta-atom dimension(s), meta-atom material(s), optical responses, meta-optic dimension(s), meta-optic shape, meta-optic geometry, etc.).

The optimization of the metasurface starts with an initial phase profile 310 and/or amplitude distribution imparted to an incident beam of light by the metasurface for selected input light conditions (e.g., polarization, wavelength, bandwidth, OAM, and/or angle of incidence). In each iteration, the design parameters are perturbed (act 320) in a random or specific sequence. The FOM is continuously evaluated using an optical diffraction integral model (or other optical simulation or analytical models) (act 330) to simulate an output optical field from the metasurface. The output optical field can be evaluated to determine (act 335) whether the perturbation on the unit cell improved the output optical field and improved the meta-optic's optical performance. If the replacement did not improve the optical performance, then the replacement is discarded (act 350) and the library of meta-atoms is checked to determine (act 345) whether all meta-atom designs from the library have been tried. If the replacement improved the performance, the new meta-atom is retained (act 340) and the library of meta-atoms is checked to determine (act 345) whether all meta-atom designs from the library have been tried. The meta-atom designs in the library can include meta-atoms of different shapes, sizes, spacings, and/or materials. If all designs from the library have been tried for the $i^{th}$ meta-atom, the process 300 can move to the next $(i+1)^{th}$ meta-atom in the array and repeat the steps beginning with the sequential replacement (act 320) of the meta-atom. The process 300 continues until all meta-atoms of the metasurface have been perturbed at least once according to the process 300.

In some cases, the process 300 can be executed on a meta-atom-by-meta-atom basis for each meta-atom in a metasurface (i.e., moving through each meta-atom in a metasurface one at a time). In other cases, the process 300 can be executed on a meta-atom-by-meta-atom basis for each meta-atom in a unit cell, and the unit cells can be stepped through by rerunning the process 300 for each unit cell. In some cases where there are identical unit cells distributed over the metasurface, the $i^{th}$ meta-atoms that are identical in each identical unit cell and at identical locations can all be replaced in the same step (act 320) of replacing meta-atoms as the process 300 iterates. According to some implementations, identical meta-atoms (having same shapes and sizes) in a metasurface can all be replaced in the same step (act 320) of replacing meta-atoms as the process 300 iterates to improve the optical performance of a meta-optic, whether or not the meta-optic includes unit cells.

For multiplexed, multifunctional metasurfaces in which a single meta-atom may exhibit different responses under different states (e.g., under different input light properties), multiple objectives are included in the FOM and can be improved simultaneously using the DBS process 300 or can be improved sequentially. The process 300 may terminate when a predetermined (e.g., user-specified) FOM improvement threshold is achieved (decision 337) for at least one of the optical functions provided by the meta-optic or a maximum number of iterations is reached, or the library of meta-atoms is exhausted for each meta-atom of the metasurface. The FOM can be one or more characteristics of a point spread function (e.g., intensity distribution, Strehl ratio, FWHM, etc.) and/or one or more characteristics of a modulation transfer function (e.g., contrast at a particular spatial frequency or set of spatial frequencies). In some cases, one or more other metrics can be used additionally, or alternatively, for the FOM (e.g., background noise, phase error, etc.). Preferably, the predetermined FOM improvement is reached before the maximum number of iterations is reached or the library is exhausted for all meta-atoms. Using this inverse optimization method, high-performance phase profiles can be designed and tailored for extracting different information of a scene (such as depth-sensitive, extended depth-of-focus, large field-of-view or broadband metasurface phase profiles), which is significantly more versatile or computationally-efficient than traditional analytical or brute-force generated solutions, respectively.

FIG. 4A, FIG. 4B, and FIG. 4C illustrate performance of an exemplary single-layer, depth-sensitive meta-optic (without a wide-FOV metasurface) with a 1 mm lens diameter and a target distance sensing range from 5 cm to 25 cm. The meta-optic reorients (rotates) an image depending on the distance of the object that is being imaged from the metasurface of the meta-optic. In this example, the object being imaged is a point source, and it is imaged as two separated point-sources that rotate depending on object-to-metasurface distance. One way to form two separated images of a single point source with a single meta-optic is to superimpose two meta-atom patterns on the meta-optic where each pattern corresponds to a lens that focuses to a location different from the other meta-atom pattern and corresponding lens. For the meta-optic of FIG. 4A, the rotation of the two imaged point sources is approximately 80 degrees for a change in distance of 20 cm. The meta-optic provides a DH-PSF optical functionality as can be seen in the series of images in FIG. 4C.

In FIG. 4B, the solid trace represents the target response for which the meta-optic was designed using the DBS process 300, described above. The plotted points represent simulated results using an optical analysis based on the optical diffraction integral. The meta-optic imparts to light in a first polarization state (e.g., horizontally polarized light) a phase profile that produces a DH-PSF. Simulation results indicate that the correlation between the rotation angle of the two foci and the depth accurately matches the target performance, covering an angular range and depth range of approximately 80° and 20 cm, respectively. These results show that object depth can be sensed over a large depth range with the meta-optic based on the DH-PSF rotation angle of recorded images.

The meta-optic of FIG. 4A can further impart a cubic phase profile that exhibits a nearly invariant object-to-metasurface distance response to light in a second polarization state (e.g., vertically polarized light). As a result, the lens provides polarization-multiplexed depth-sensitive and depth-insensitive phase profiles. Furthermore, other optical computing functionalities can also be included in the multiple states of the multifunctional metasurface design for additional data extraction—for example, the metasurface may encode a phase profile acting as a 2-D Laplace operator for performing second-order spatial differentiation for edge detection and image differentiation.

FIG. 5A illustrates a process 500 for image reconstruction and depth estimation from light focused by an appropriately designed multi-function meta-optic onto a focal plane imaging array or other detector array. Two raw sub-images 510-1, 510-2 under different polarizations are first captured by the depth-sensitive and depth-insensitive optical functionalities of the meta-optic (e.g., as described above with respect to FIG. 4A-FIG. 4C). The distance-insensitive functionality operates as an extended depth-of-field (EDOF) lens for a first polarization. The distance-sensitive functionality operates as a DH-PSF lens. An initial transverse image 520 is generated by deconvolution of the raw depth-insensitive sub-image 510-1 using a randomly selected point spread function (PSF) 515 generated for the EDOF lens within the range of its designed depth-of-field. Additionally, the sub-image 510-2 captured by the DH-PSF functionality of the meta-optic is deconvolved using a selected DH-PSF to estimate a distance to at least one object in the image. The selected DH-PSF determines the estimated distance and an object with the sharpest feature (e.g., least blurred edges) is located at the estimated distance. If all objects (or objects of interest) in the image are at the same distance, several iterations of selecting a DH-PSF and deconvolving the distance-sensitive sub-image 510-2 can be performed to obtain an estimated distance to the objects. Once an estimated distance is obtained, the EDOF PSF for deconvolving the distance-insensitive sub-image 510-1 can be revised to improve the transverse image 520. Iterative cycles of selecting DH-PSFs and revising EDOF PSFs can be carried out to improve the estimated distance(s) to one or more objects in the transverse image 520 and to improve the quality of the transverse image 520.

As an example, the image reconstruction of a scene $I_S$ can be performed by solving the Tikhonov regularized least-squares problem:

$$\min_{\{\tilde{I}\}} \left\| y - S(p * \tilde{I}) \right\|_2^2 + \gamma \|\tilde{I}\|_2^2, \quad (1)$$

where $\tilde{I}$ is the unknown variable, y is the formed image (I, obtained using the diffraction integral model) integrated over the sensor pixels with added noise, S is the pixel integration and sampling operator, p is the PSF of a certain information channel (e.g., depth, field angle, wavelength, polarization, etc.), $\tilde{I}$ is the estimate of the scene image, and $\gamma$ is a regularization parameter. This problem can be solved in closed form with Wiener filtering assuming circular boundary conditions:

$$\hat{I} = \mathcal{F}^{-1}\left\{\frac{\overline{p}^*}{|\overline{p}|^2 + \gamma}\mathcal{F}\{y\}\right\}, \quad (2)$$

where $\overline{p}$ is the optical transfer function of p.

When the reconstruction process is involved in the co-optimization with the multifunctional meta-optics using variables from both sides, a differentiable loss function L (e.g., mean squared error with respect to the ground-truth images) can be defined on the reconstructed images:

$$\mathcal{L}(\hat{I}, I_S) = \sum_{c\in\{Ch1,Ch2...ChN\}}\|\hat{I} - I_S\|_2^2, \quad (3)$$

Since the reconstruction is parameterized by the PSFs, the multiplexed meta-optical system optimization and the post-processing stages are directly connected in an end-to-end manner, allowing a joint optimization process for computational image reconstruction. Other deconvolution/reconstruction methods may also be utilized, such as approaches based on machine learning.

FIG. 5B and FIG. 5C show preliminary results indicating that high-accuracy depth estimation and high-quality image reconstruction can be obtained over a large depth range using the process in FIG. 5A. Compared to a traditional lens without wavefront encoding, a multifunctional meta-optic with a multiplexed PSF (e.g., EDOF PSF and DH-PSF) can provide improved distance sensing, extended depth of field, and broadband operation. The multifunctional metasurface (a computational flat optics layer) can be readily fabricated onto the front surface or aperture of a wide-FOV metalens architecture to realize wide-angle, high-resolution, extended depth-of-field 3-D imaging.

An optical sensing/imaging system may include the multifunctional meta-optic, a switchable filter (e.g., a switchable polarization or wavelength filter), and at least one image sensor (e.g., CMOS or CCD imaging array) located at the image plane(s) of the meta-optic. Depending on the property of light incident on the system, the meta-optic can provide different optical functions for operating on the incident light to realize different light intensity/field distributions on the image sensor(s). The switchable filter can be toggled to selectively transmit light of different properties (e.g., polarization states or wavelengths) onto the image sensor(s). A liquid crystal device is an example of a switchable filter that may be used to select the polarization state of the light transmitted to the system or to the image sensor(s) or to serve as a wavelength filter. A switchable filter may be used to further improve selectivity of a light property and reduce crosstalk in an optical system between light of different properties. In some cases, the switchable filter can further produce optical output at two locations. For example, light of a first property is transmitted by the filter to form a first image at a first location and light of a second property is reflected to form a second image at a second location. Switchable filters are examples of active filters in that they can be physically reconfigured under external control (e.g., rotated from a first orientation to a second orientation) to perform two different optical functions. The sensing/imaging system may further include light emitters for active illumination of a scene that is to be imaged by the system. For example, the image sensor may include light emitters that illuminate the scene with light of different polarizations by toggling different light emitters or toggling a polarization filter between different polarization states. In another example, the sensing system may include light emitters that illuminate the scene with light of different wavelengths by toggling different light emitters or toggling between spectral filters that pass different emission wavelengths from a common light emitter. The light emitters may also be configured to emit structured light patterns to illuminate the scene.

Parfocal Zoom Lens

FIG. 6 illustrates a parfocal zoom lens 600 with a multiplexed metasurface architecture (a parfocal zoom lens is a zoom lens that stays in focus when its magnification/focal length is changed). The parfocal zoom lens 600 can include a first (entrance) metasurface MS-1 having meta-atoms 200 formed on a first surface of the first substrate 610 and a second (exit) metasurface MS-2 having meta-atoms 200 formed on a second surface of the same substrate or on a second substrate 620 as shown in FIG. 6. If the metasurfaces are on separate substrates, the substrates may be separated by an air gap 630 or another substrate. Alternatively, the metasurfaces can be on the outer surfaces and/or the inner (facing) surfaces of the substrates.

The meta-atoms 200 in at least one of the parfocal zoom lens's metasurfaces operate in at least two modes that affect the incident light differently according to a property of the incident light (e.g., polarization, wavelength, incident angle, etc.). By toggling, stepping, or sweeping the polarization, wavelength, incidence angle, or other property of the incident light, the optical functions of the first and second metasurfaces can be accessed independently. For example, the first metasurface MS-1 may act as a converging lens for vertically polarized light and as a diverging lens for horizontally polarized light, whereas the second metasurface MS-2 may act as a converging lens for both horizontally and vertically polarized light. The independently controllable changes in focusing characteristics of the two meta-surfaces can provide optical zoom with a fixed track-length of the optical train. (Either or both metasurfaces can be sensitive to changes in the polarization or wavelength of incident light.) As such, variation in optical magnification can be achieved without moving one substrate 610 with respect to the other substrate 620 or one metasurface MS-1 with respect to the other metasurface MS-2. A parfocal zoom lens could then be implemented in a highly compact package (e.g., having a form factor occupying less than 10 cubic centimeters or less than 1 cubic centimeter).

An active or passive beam splitter or filter can be used in conjunction with the multifunctional metasurface. In one embodiment, a beam splitter (e.g., a polarizing beam splitter, or a dichroic mirror) may be added to split and direct light with different properties (e.g., different polarization states, or wavelengths) to different detector arrays. As a result, different images generated by the multifunctional metasurface can be captured simultaneously or sequentially by the different detector arrays according to the properties of light. Simultaneous image capture can be obtained by using light having a 45-degree, elliptical or circular polarization, where the beam splitter or filter divides horizontal and vertical polarization components onto two different optical paths. In some cases, a metasurface or multifunctional metasurface can divide the horizontal and vertical polarization components onto two different optical paths. In some embodiments, pixelated filter arrays with different filtering properties can be integrated on the image sensor pixel arrays. As a result, different images generated by the multifunctional lens can be captured by different detector pixels according to the different properties of light (e.g., polarization states, wavelength, etc.).

The parfocal zoom lens 600 can be included in an optical system that includes an optical device 660 located at the image plane of the zoom lens 600. The optical device can be an image sensor (e.g., a CMOS or CCD imaging array) when the zoom lens 600 is used to image a scene. In other implementations described further below, the optical device 660 can be an emitter array or micro-display when the zoom lens 600 is used to project images.

Besides passive imaging/sensing, an inventive parfocal zoom lens 600 may further operate in active illumination mode by including light emitters 650. For example, the parfocal zoom lens 600 may be used in conjunction with light emitters 650 that illuminate the scene with light of different polarizations by toggling different light emitters or polarization filters. A liquid crystal device may also be used to tune the polarization state of the light or serve as a wavelength filter. In another example, the parfocal zoom lens 600 may be used in conjunction with light emitters 650 that illuminate the scene with light of different wavelengths by toggling different light emitters or spectral filters. Structured light patterns may also be utilized to illuminate the scene.

In some implementations, a metasurface MS-1 of a parfocal zoom lens or other lens can be configured to realize variable apertures by selectively allowing or preventing a zone (e.g., zone 1 of the metasurface MS-1 in FIG. 6) of the metasurface to transmit the incident light at a certain state (e.g., a polarization state, wavelength, AOI, incident position, etc.). For example, horizontally polarized light (indicated by the solid rays in FIG. 6) entering one or more selected zones of the metasurface (e.g., outer zone 2 of MS-1 in FIG. 6) may be deflected and trapped inside the first substrate via total internal reflection as illustrate, while vertically polarized light (indicated by the dashed rays) is transmitted through the same zone(s) and reshaped. Some zones of the metasurface MS-1 or any metasurface may also be designed to absorb, reflect, or otherwise block or attenuate the incident light. In some cases, a zone on a first metasurface of a meta-optic (e.g., zone 2 on metasurface MS-1) can deflect light at a first wavelength, polarization, or incident angle to a region on a subsequent surface where the deflected light will be reflected, blocked, or otherwise prevented from participating in image formation, pattern formation, or optical sensing by the meta-optic or optical system, whereas light at a second wavelength, polarization, or incident angle may not be deflected by the first zone and may participate in image formation, pattern formation, or optical sensing.

FIG. 7A and FIG. 7B depict an example configuration of a parfocal zoom lens 600 that can provide at least 10× optical zoom and be implemented with structure like that shown in FIG. 6. In some cases, from 5× to 50× optical zoom may be achieved with a parfocal zoom lens that utilizes meta-atoms on two metasurfaces according to the described implementations. For the illustrated example operating at 670 nm wavelength, polarization-multiplexed metasurfaces MS-1, MS-2 may be used, with meta-atoms formed from amorphous silicon and the substrate from silica. Imaging at other wavelengths is possible by selecting different materials and/or scaling the meta-atom sizes and spacings. The spaces between the multiple surfaces in the optical system (including the optical component surfaces, window surface, and image sensor surface, etc.) can be filled with air or another medium (e.g., epoxy, glass/polymer spacer, etc.).

The parfocal zoom lens 600 in FIG. 7A and FIG. 7B has an entrance pupil diameter that is controllably adjusted from 0.8 mm to 1.6 mm, though other values are possible. The fixed track length from the first metasurface to the image plane is approximately 4.82 mm. The back focal length is approximately 2.46 mm. The field of view can vary from 40° to 4° between the two polarization states, while achieving near-diffraction-limited imaging performance. Switching between horizontally and vertically polarizations states changes the effective focal length of the parfocal zoom lens 600 by a factor of about 10×. The effective aperture of the parfocal zoom lens can be varied between two or more sizes by configuring two or more zones of a metasurface (e.g., MS-1) to have different responses to incident light of different properties (e.g., polarization, wavelength, incident angle properties). For example, a portion or zone (e.g., zone 2 in FIG. 6) of the meta-atom array can be configured to internally reflect light of a first polarization and transmit light of a second polarization, thereby changing the zone's transmittance and the parfocal zoom lens' effective aperture size. In the illustrated example of FIG. 6, light of the first polarization is coupled into the first substrate 610 at an angle less than a critical angle for the first substrate. In another example, the phase imparted by a portion of the meta-atom array for a first polarization or wavelength can selectively steer a portion of the incident beam in one direction compared to the phase imparted for a second polarization or wavelength such that the effective aperture size of the optical system can be varied between two values. More generally, the spectral, angular, and/or spatial response of a portion of a meta-atom array can be designed to selectively modulate, transmit, or block a portion of the beam incident on the meta-atom array according to the incident beam's wavelength, AOI, incident position, respectively, to realize multiple optical functions for a meta-optic, such as the above-mentioned parfocal zoom lens. The selective modulating (e.g., beam steering), transmission, or blocking may toggle between two or more states.

A zoom optical sensing/imaging system may include zoom meta-optics like those in FIG. 6 and FIG. 7A, a switchable filter, and an image sensor. Depending on the property of light, the meta-optics can provide different optical functions for operating on the incident light to realize variable magnification or light intensity/field distribution on an image sensor located at an imaging plane of the optical system. The switchable filter can be toggled to selectively transmit light of a selected property from among different properties (e.g., selected polarization state from among different polarization state or selected wavelength from among different wavelengths) onto the image sensor. A liquid crystal modulator may also be used to tune the polarization state of the light or serve as a wavelength filter. The optical sensing/imaging system may further include light emitters for active illumination. For example, the sensing/imaging system may include light emitters that illuminate the scene with light of different polarizations by toggling different light emitters or polarization filters (e.g., a tunable liquid crystal wave plate or filter). In another example, the sensing/imaging system may include light emitters that illuminate the scene with light of different wavelengths by toggling different light emitters or spectral filters. Structured light patterns may also be utilized.

The parfocal zoom lens of FIG. 6 or FIG. 7A, when used in reverse with the image sensors replaced by a light emitter array (e.g., VCSELs, micro-LEDs, etc.) or a micro-display, can readily enable high-quality image/pattern projection with variable magnification or projection of varied patterned optical intensity/field distributions. A reconfigurable optical projector system may include at least one zoom meta-optic lens as described above, a light emitter array or micro-display, and an optional switchable filter. Depending on the property of light, the meta-optics provide different optical functions to modulate light to realize variable magnifications or light intensity/field distributions of the emitted light by the reconfigurable optical projector system. When desired, the switchable filter can be toggled to selectively transmit light of different properties (e.g., polarization states or wavelengths) emitted by the light emitter array. For example, the optical projector system may include light emitter arrays or a micro-display that projects an image with light of different polarizations by toggling different light emitters or polarization filters. A liquid crystal device may also be used to adjust or select the polarization state of the light or serve as a wavelength filter. In another example, the optical projector system may include light emitter arrays or a micro-display that projects an image with light of different wavelengths by toggling different light emitters or spectral filters. Structured light patterns may also be projected.

Additional optical functionalities can be achieved using one, two, or more metasurfaces in addition to those described for the optical devices above. For example, an added metasurface can be used for beam steering on a distance-sensing meta-optic or parfocal zoom lens, so that a larger field of view can be swept and imaged than would be the case without beam steering. For some implementations, different optical functions can be combined in one metasurface. For example, half of the meta-atoms on a metasurface can be designed to provide a first optical function and half of the meta-atoms on the surface can be designed to provide a second optical function. The two halves of meta-atoms can be overlaid and dispersed among each other across the metasurface or segregated into different spatial regions or unit cells. According to one example, meta-atoms for an imaging functionality (e.g., distance sensing or parfocal zoom lens) can be combined with meta-atoms for beam steering, each of which may have two or more states selectable base on different properties of the incident light. Besides zoom, beam steering, or computational imaging functions (such as distance sensing or pattern generation), other optical functions can also be realized. In general, depending on the property of incident light, the meta-optics (including one, two, or more metasurfaces) can be configured to provide different optical functions to produce variable light intensity/field distribution. Therefore, reconfigurable optical sensing, imaging, and/or image projecting based on light properties such as polarization, OAM, wavelength, and AOI can be realized.

FIG. 8 depicts an example of an optical system 800 that includes a multifunction meta-optic 100 and a switchable filter 810. The meta-optic 100 may be arranged to view a scene or an object 802. The optical system 800 may be configured to form an image onto an image plane 820, which can be flat (as depicted) or curved. At least one optical device 660 can be located at the image plane to record the image (e.g., image sensor) or to project the image (e.g., image projector). Some systems can include an optical source 805 (such as an emitter array) to generate light having more than one optical property (e.g., different polarization states, different wavelengths, different OAM). The described systems may further include at least one image sensor and/or projector. In general, reconfigurable, multifunction optical sensing, imaging, and/or projecting systems described herein can include at least one meta-optic and a switchable filter (optional for optical illumination or projection).

Depending on the property of light, the meta-optic (which can include one, two, or more metasurfaces) can provide different optical functions to operate on light incident on the meta-optic and realize variable light intensity/field distribution on an image sensor or emitted by an optical source or micro-display, for example.

Multifunctional meta-optics can be implemented and/or included in optical systems in various configurations. Example configurations are listed below. Corresponding methods of using the meta-optics and operating the optical systems can also be implemented.

(1) An optic comprising: a substrate; and a metasurface comprising a plurality of meta-atoms disposed on a first side of the substrate and configured to impart a depth-sensitive phase profile to first incident light in a first state and to impart a depth-insensitive phase profile to second incident light in a second state different than the first state.

(2) The optic of configuration 1, wherein the depth-sensitive phase profile is characterized by two foci whose locations vary according to depth and the depth-insensitive phase profile comprises a cubic phase profile.

(3) The optic of configuration 1 or 2, wherein the first state is a first polarization state and the second state is a second polarization state.

(4) The optic of configuration 1 or 2, wherein the first state is a first wavelength state and the second state is a second wavelength state.

(5) The optic of any one of configurations 1 through 4, further comprising:
a second metasurface disposed on a second side of the substrate opposite the first side of the substrate and configured to form an image on an image plane of a scene viewed by the optic.

(6) The optic of configuration 5, wherein the image plane is flat.

(7) The optic of configuration 6, wherein the second metasurface is configured to direct the first incident light and the second incident light to the image plane.

(8) An optical sensing system comprising:
the optic of any one of configurations 1 through 7;
a filter in optical communication with the optic;
a first image sensor in optical communication with the filter to receive the first incident light in the first state and not receive the second incident light in the second state; and
a second image sensor in optical communication with the filter to receive the first incident light in the second state and not receive the first incident light in the first state.

(9) An optical sensing system comprising:
the optic of any one of configurations 1 through 7;
a switchable filter in optical communication with the optic; and an image sensor in optical communication with the optic.

(10) The optical sensing system of configuration 9, wherein the switchable filter in a first configuration transmits first light of a first polarization state and suppresses transmission of second light of a second polarization state and in a second configuration transmits the second light of the second polarization state and suppresses transmission of the first light of the first polarization state.

(11) The optical sensing system of configuration 9, wherein the switchable filter in a first configuration transmits first light of a first wavelength and suppresses transmission of second light of a second wavelength and in a second configuration transmits the second light of the second wavelength and suppresses transmission of the first light of the first wavelength.

(12) The optical sensing system of any one of configurations 1 through 11, further comprising: light emitters configured to illuminate a scene viewed by the optic with light of different polarizations.

(13) The optical sensing system of any one of configurations 1 through 11, further comprising: light emitters configured to illuminate a scene viewed by the optic with light of different wavelengths.

(14) A multifunctional optic comprising: a first transparent substrate; a second transparent substrate spaced apart from the first transparent substrate; a first metasurface comprising a first plurality of meta-atoms disposed on a first surface of the first transparent substrate; and a second metasurface comprising a second plurality of meta-atoms disposed on a second surface of the second transparent substrate, wherein the first metasurface and the second metasurface are configured to focus first incident light in a first state to an image plane with a first magnification or to perform a first optical function and to focus second incident light in a second state different than the first state to the image plane with a second magnification different than the first magnification or to perform a second optical function that is different from the first optical function, and wherein relative positions of the first transparent substrate, the second transparent substrate, and the image plane remain unchanged when focusing the first incident light in the first state and focusing the second incident light in the second state.

(15) The multifunctional optic of configuration 14, wherein the first metasurface is configured to converge the first incident light in the first state and to diverge the second incident light in the second state and the second metasurface is configured to converge the first incident light in the first state and to converge the second incident light in the second state so that the multifunctional optic functions as a parfocal zoom lens.

(16) The multifunctional optic of configuration 14, wherein the first metasurface defines a first zone configured to transmit the first incident light in the first state and the second incident light in the second state and a second zone configured to transmit the first incident light in the first state and to block, absorb, reflect, and/or deflect the second incident light in the second state.

(17) The multifunctional optic of configuration 14, wherein the first metasurface defines a first zone configured to transmit the first incident light in the first state and the second incident light in the second state and a second zone configured to transmit the first incident light in the first state and to couple the second incident light in the second state into the first transparent substrate at an angle less than a critical angle of the first transparent substrate.

(18) A multifunctional optic comprising: a transparent substrate; a first metasurface comprising a first plurality of meta-atoms disposed on a first surface of the transparent substrate; and a second metasurface comprising a second plurality of meta-atoms disposed on a second surface of the transparent substrate or on a second surface of a second transparent substrate, wherein the first metasurface and the second metasurface are configured to perform a first optical function for first incident light in a first state and to perform a second optical function for second incident light in a second state different than the first state, wherein the first optical function comprises distance-sensing, projecting an image, or projecting a pattern of the first incident light.

(19) The multifunctional optic of configuration 18, wherein the first metasurface is configured to converge the first incident light in the first state and to diverge the second incident light in the second state and the second metasurface is configured to converge the first incident light in the first state and to converge the second incident light in the second state so that the multifunctional optic functions as a parfocal zoom lens.

(20) The multifunctional optic of configuration 18, wherein the first metasurface defines a first zone configured to transmit the first incident light in the first state and the second incident light in the second state and a second zone configured to transmit the first incident light in the first state and to block, absorb, reflect, and/or deflect the second incident light in the second state.

(21) The multifunctional optic of configuration 18, wherein the first metasurface defines a first zone configured to transmit the first incident light in the first state and the second incident light in the second state and a second zone configured to transmit the first incident light in the first state and to couple the second incident light in the second state onto a region of the second metasurface that is configured to block, absorb, reflect, and/or deflect the second incident light.

(22) An optical sensing/imaging system comprising: the multifunctional optic of any one of configurations 18 through 21; a switchable filter in optical communication with the multifunctional optic; and an image sensor in optical communication with the multifunctional optic, wherein the switchable filter in a first configuration transmits the first incident light of a first polarization state, a first wavelength, or a first orbital angular momentum and in a second configuration transmits the second incident light of a second polarization state, a second wavelength, or a second orbital angular momentum.

(23) The optical sensing/imaging system of any one of configurations 18 through 22 further comprising light emitters configured to illuminate a scene viewed by the multifunctional optic with light of different wavelengths, different polarization states, or different orbital angular momentums.

(24) An optical projection system comprising: the multifunctional optic of any one of configurations 18 through 21; a switchable filter in optical communication with the multifunctional optic; and a light emitter array in optical communication with the multifunctional optic, wherein the switchable filter is configured to selectively transmit the first incident light of a selected polarization state from among different polarization states, a selected wavelength from among different wavelengths, or a selected orbital angular momentum from among different orbital angular momentums.

(25) The optical projection system of configuration 24, wherein the light emitter array is a micro-display.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optic comprising:
   a substrate; and
   a metasurface comprising a plurality of meta-atoms disposed on a first side of the substrate and configured to impart a depth-sensitive phase profile to first incident light in a first state and to impart a depth-insensitive phase profile to second incident light in a second state different than the first state, wherein:
      each meta-atom of the plurality of meta-atoms is a microfabricated structure disposed on the first side of the substrate, and
      the first incident light and the second incident light are detectable by a CCD camera or CMOS imaging array.

2. The optic of claim 1, wherein the depth-sensitive phase profile is characterized by two foci whose locations vary according to depth and the depth-insensitive phase profile comprises a cubic phase profile.

3. The optic of claim 1, wherein the first state is a first polarization state and the second state is a second polarization state.

4. The optic of claim 1, wherein the first state is a first wavelength state and the second state is a second wavelength state.

5. The optic of claim 1, further comprising:
a second metasurface disposed on a second side of the substrate opposite the first side of the substrate and configured to form an image on an image plane of a scene viewed by the optic.

6. The optic of claim 5, wherein the image plane is flat.

7. The optic of claim 6, wherein the second metasurface is configured to direct the first incident light and the second incident light to the image plane.

8. An optical sensing system comprising:
the optic of claim 1;
a filter in optical communication with the optic;
a first image sensor in optical communication with the filter to receive the first incident light in the first state and not receive the second incident light in the second state; and
a second image sensor in optical communication with the filter to receive the first incident light in the second state and not receive the first incident light in the first state.

9. An optical sensing system comprising:
the optic of claim 1;
a switchable filter in optical communication with the optic; and
an image sensor in optical communication with the optic.

10. The optical sensing system of claim 9, wherein the switchable filter in a first configuration transmits first light of a first polarization state and suppresses transmission of second light of a second polarization state and in a second configuration transmits the second light of the second polarization state and suppresses transmission of the first light of the first polarization state.

11. The optical sensing system of claim 9, wherein the switchable filter in a first configuration transmits first light of a first wavelength and suppresses transmission of second light of a second wavelength and in a second configuration transmits the second light of the second wavelength and suppresses transmission of the first light of the first wavelength.

12. The optical sensing system of claim 9, further comprising:
light emitters configured to illuminate a scene viewed by the optic with light of different polarizations.

13. The optical sensing system of claim 9, further comprising:
light emitters configured to illuminate a scene viewed by the optic with light of different wavelengths.

* * * * *